United States Patent
Leng et al.

(10) Patent No.: US 12,470,995 B2
(45) Date of Patent: Nov. 11, 2025

(54) FAILURE RECOVERY FOR JOINT OPERATION OF CONDITIONAL HANDOVER AND CONDITIONAL PSCELL ADDITION OR CHANGE

(71) Applicant: Samsung Electronics Co., Ltd., Suwon-si (KR)

(72) Inventors: Shiyang Leng, Allen, TX (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 425 days.

(21) Appl. No.: 18/174,362

(22) Filed: Feb. 24, 2023

(65) Prior Publication Data

US 2023/0300708 A1   Sep. 21, 2023

Related U.S. Application Data

(60) Provisional application No. 63/321,462, filed on Mar. 18, 2022, provisional application No. 63/320,055, filed on Mar. 15, 2022.

(51) Int. Cl.
*H04W 36/36* (2009.01)
*H04W 24/04* (2009.01)
*H04W 36/00* (2009.01)

(52) U.S. Cl.
CPC ......... *H04W 36/362* (2023.05); *H04W 24/04* (2013.01); *H04W 36/0079* (2018.08)

(58) Field of Classification Search
CPC ............... H04W 36/362; H04W 24/04; H04W 36/0079; H04W 76/19; H04W 36/0069; H04W 76/15

See application file for complete search history.

(56) References Cited

U.S. PATENT DOCUMENTS

| | | | |
|---|---|---|---|
| 2023/0379771 A1* | 11/2023 | Selvaganapathy | H04W 36/362 |
| 2023/0397080 A1* | 12/2023 | Parichehrehteroujeni | ................... H04W 36/08 |
| 2024/0397404 A1* | 11/2024 | Teyeb | H04W 36/305 |

FOREIGN PATENT DOCUMENTS

| WO | 2021076502 A1 | 4/2021 |
|---|---|---|
| WO | 2021189442 A1 | 9/2021 |

OTHER PUBLICATIONS

Khodapanah, Behnam, et al. "On L1/L2-Triggered Mobility in 3GPP Release 18 and Beyond." IEEE Access (2024). (Year: 2024).*
International Search Report and Written Opinion issued May 25, 2023 regarding International Application No. PCT/KR2023/003358, 7 pages.

(Continued)

*Primary Examiner* — Sharad Rampuria

(57) ABSTRACT

Methods and apparatuses for a joint operation of a conditional handover (CHO) and a conditional primary secondary cell group (SCG) cell (PSCell) addition/change (CPA/CPC) in a wireless communication system. A method of a UE comprises triggering a joint operation of a CHO and a CPC and determining whether the CHO fails while performing the joint operation of the CHO and the CPC. The method further includes halting a CPC execution condition evaluation or a CPC execution based on a determination that the CHO fails and performing a failure recovery procedure for the joint operation of the CHO and the CPC.

20 Claims, 8 Drawing Sheets

(56) References Cited

OTHER PUBLICATIONS

Lenovo et al., "Coexistence of CHO and CPAC", 3GPP TSG-RAN WG2 Meeting #117-e, R2-2202579, Feb. 2022, 17 pages.
ZTE Corporation et al., "Discussion on coexistence of CHO and CPAC", 3GPP TSG-RAN WG2 Meeting #117-e, R2-2202826, Feb. 2022, 54 pages.
Interdigital et al., "Coexistence of CHO and CPAC", 3GPP TSG-RAN WG2 Meeting #117-e, R2-2202579, Feb. 2022, 13 pages.
"5G; NR; NR and NG-RAN Overall description; Stage-2 (3GPP TS 38.300 version 16.6.0 Release 16)", ETSI TS 138 300 V16.6.0, Sep. 2021, 154 pages.
"5G; NR; Radio Resource Control (RRC); Protocol specification (3GPP TS 38.331 version 16.6.0 Release 16)", ETSI TS 138 331 V16.6.0, Oct. 2021, 948 pages.
"Universal Mobile Telecommunications System (UMTS); LTE; 5G; NR; Multi-connectivity; Overall description; Stage-2 (3GPP TS 37.340 version 16.7.0 Release 16)", ETSI TS 137 340 V16.7.0, Sep. 2021, 90 pages.
"5G; NR; Medium Access Control (MAC) protocol specification (3GPP TS 38.321 version 16.6.0 Release 16)", ETSI TS 138 321 V16.6.0, Oct. 2021, 160 pages.

* cited by examiner ically coupled to the processor. The transceiver is configured to, for a joint operation of a CHO and a conditional CPC: if (i) a fast master cell group (MCG) link recovery is configured, (ii) SCG transmissions for radio bearers are not suspended, and (iii) the CPC execution is halted: receive, from a UE, a message indicating a failure of the CHO in the joint operation of the CHO and the CPC; and transmit a command to perform a handover to a PCell; and if (i) the MCG link recovery is not configured, (ii) SN bearers are suspended, or (iii) the CPC execution is not halted: perform a RRC connection re-establishment procedure with the UE.

FAILURE RECOVERY FOR JOINT OPERATION OF CONDITIONAL HANDOVER AND CONDITIONAL PSCELL ADDITION OR CHANGE

CROSS-REFERENCE TO RELATED APPLICATIONS AND CLAIM OF PRIORITY

The present application claims priority to U.S. Provisional Patent Application No. 63/320,055, filed on Mar. 15, 2022, and U.S. Provisional Patent Application No. 63/321,462, filed on Mar. 18, 2022. The contents of the above-identified patent documents are incorporated herein by reference.

TECHNICAL FIELD

The present disclosure relates generally to wireless communication systems and, more specifically, the present disclosure relates to a failure recovery for a joint operation of conditional handover and conditional primary secondary cell group (SCG) cell (PSCell) addition or change in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a failure recovery for a joint operation of conditional handover and conditional PSCell addition or change in a wireless communication system.

In one embodiment, a user equipment (UE) in a wireless communication system is provided. The UE comprises a transceiver. The UE further comprises a processor operably coupled to the transceiver, the processor configured to trigger a joint operation of a conditional handover (CHO) and a conditional PSCell change (CPC), determine whether the CHO fails while performing the joint operation of the CHO and the CPC, halt a CPC execution condition evaluation or a CPC execution based on a determination that the CHO fails, and perform a failure recovery procedure for the joint operation of the CHO and the CPC.

In another embodiment, a method of a UE in a wireless communication system is provided. The method comprises triggering a joint operation of a CHO and a CPC, determining whether the CHO fails while performing the joint operation of the CHO and the CPC, halting a CPC execution condition evaluation or a CPC execution based on a determination that the CHO fails and performing a failure recovery procedure for the joint operation of the CHO and the CPC.

In yet another embodiment, a base station (BS) in a wireless communication is provided. The BS comprises a processor and a transceiver operably coupled to the proces- Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The following documents are hereby incorporated by reference into the present disclosure as if fully set forth herein: "3GPP TS 38.300 v16.6.0, NR; NR and NG-RAN Overall description"; "3GPP TS 38.331 v16.6.0, NR; Radio Resource Control (RRC) protocol specification"; "3GPP TS 37.340 v16.7.0, UMTS; LTE; NR; Multi-connectivity; Overall description"; and "3GPP TS 38.321 v16.6.0, NR; Medium Access Control (MAC) protocol specification."

Figure 1:
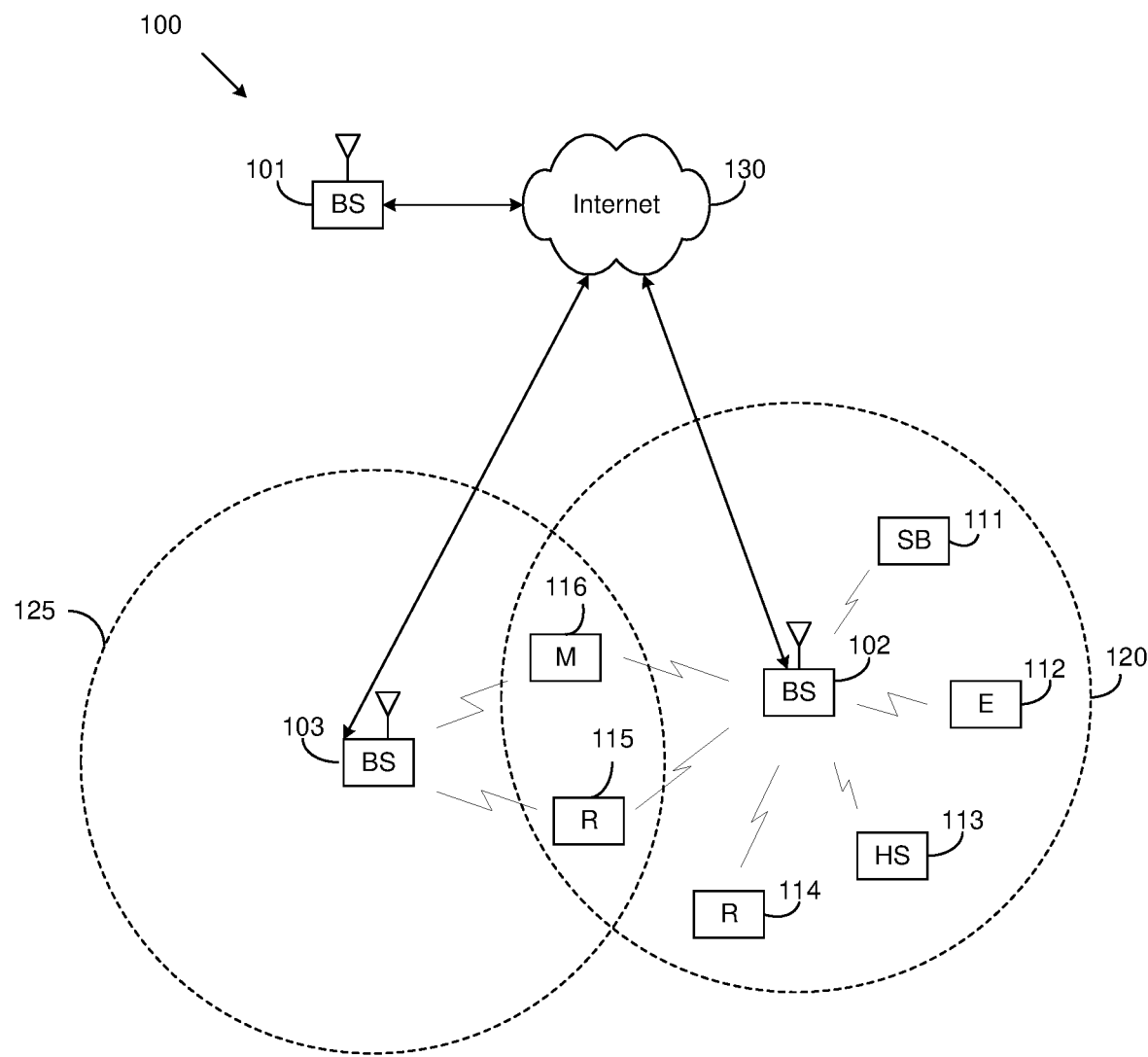
FIG. 1 illustrates an example of wireless network according to embodiments of the present disclosure.
Figure 2:
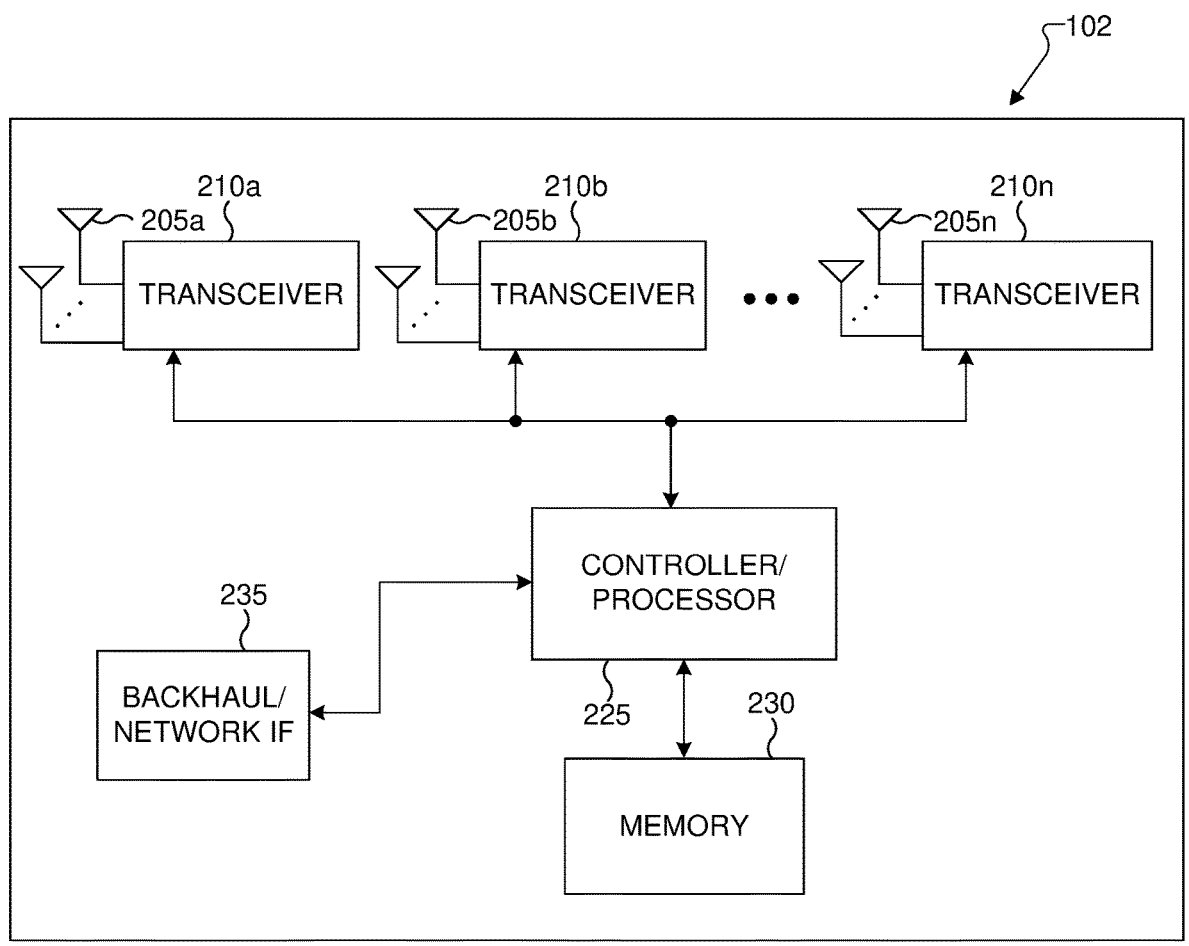
FIG. 2 illustrates an example of gNB according to embodiments of the present disclosure.
Figure 3:
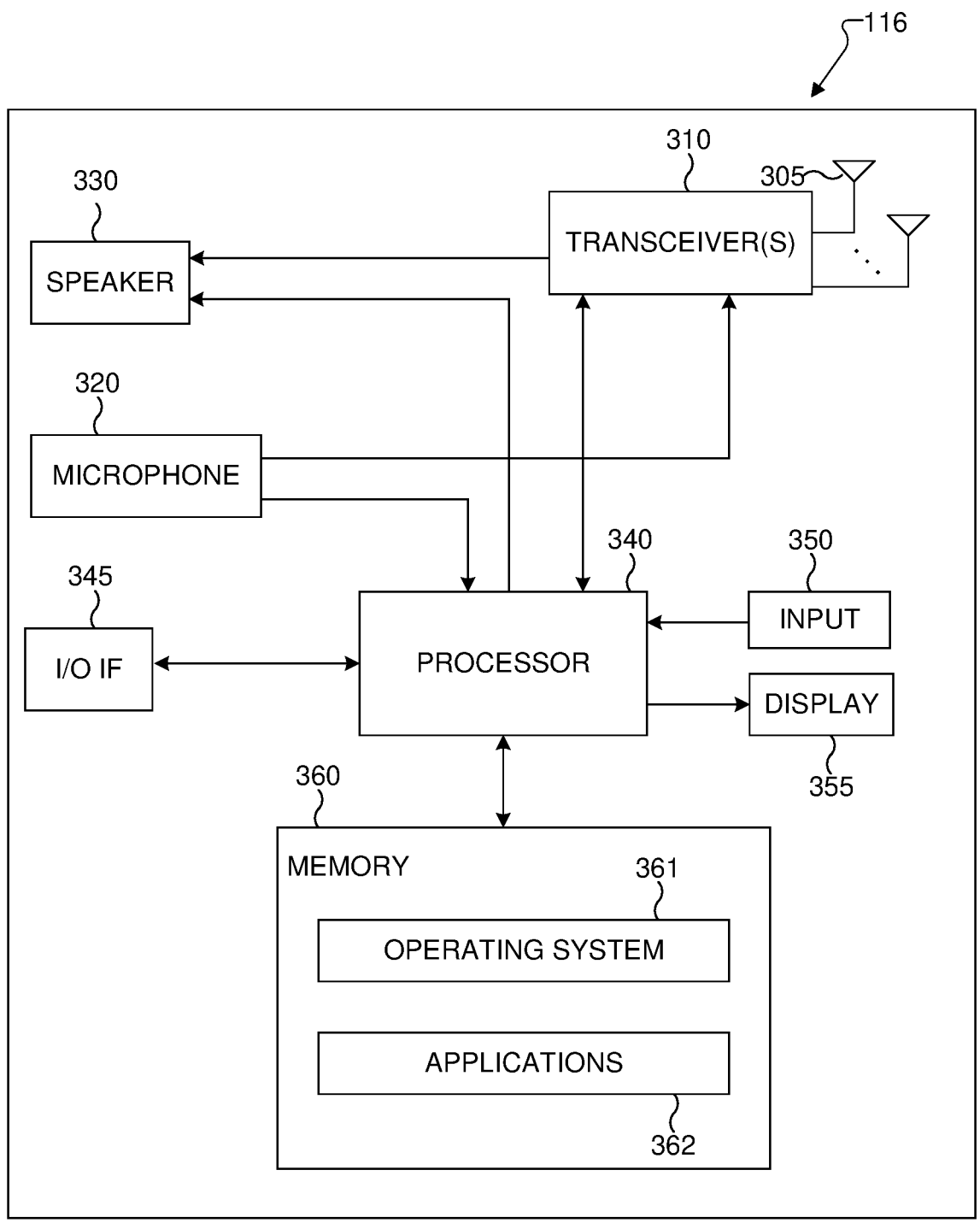
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a failure recovery for a joint operation of conditional handover and conditional PSCell addition or change in a wireless communication system. In certain embodiments, and one or more of the gNBs 101-103 includes circuitry, programing, or a combination thereof, for a failure recovery for a joint operation of conditional handover and conditional PSCell addition or change in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes for a failure recovery for a joint operation of conditional handover and conditional PSCell addition or change in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a failure recovery for a joint operation of conditional handover and conditional PSCell addition or change in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
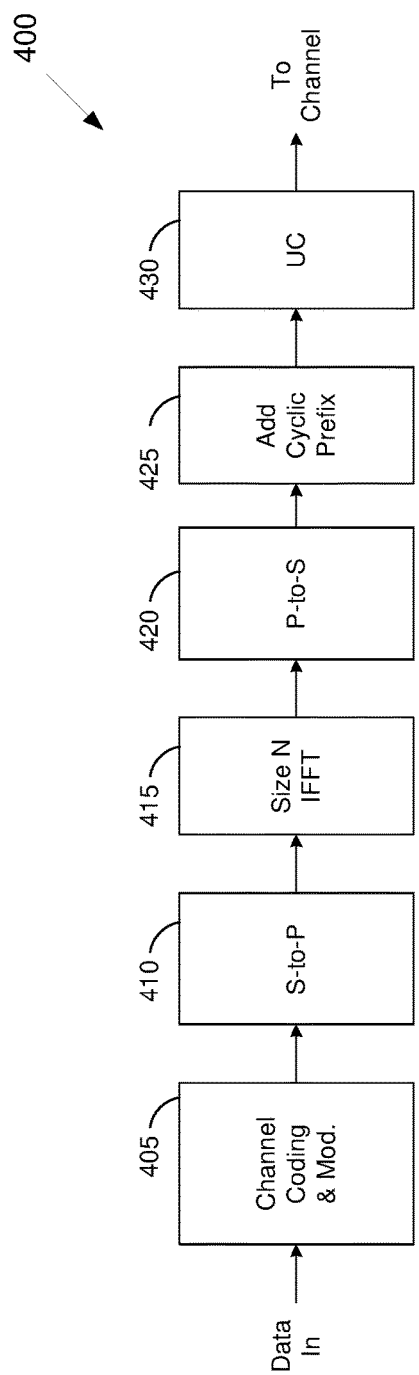
FIGS. 4 and 5 illustrate example of wireless transmit and receive paths according to this disclosure.
Figure 5:
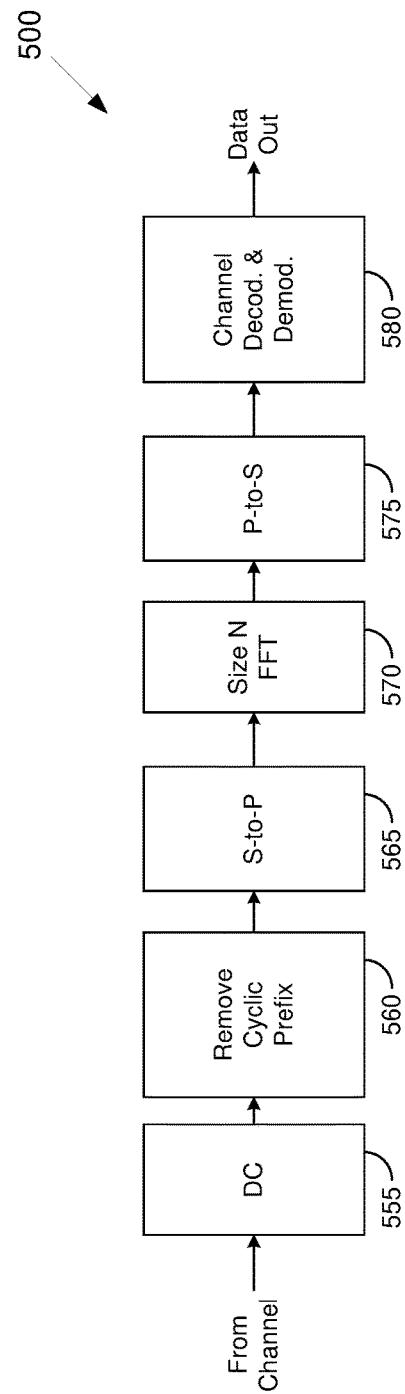

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serialto-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

3GPP has developed technical specifications and standards to define the new 5G radio-access technology, known as 5G NR. Mobility handling is a critical aspect in any mobile communication system including 5G system. For a UE in a connected mode, mobility is controlled by the network with the assistance from the UE to maintain a good quality of connection. Based on the measurement on radio link quality of the serving cell and neighboring cell(s) reported by the UE, the network may hand over the UE to a neighboring cell that can provide better radio conditions when the UE is experiencing a degraded connection to the serving cell.

In release-15 NR, the basic mechanism and procedure of network-controlled mobility in connected mode is developed. In release-16 NR, enhancements to network-controlled mobility in connected mode are introduced to mitigate connection interruption during handover procedure, among which is the conditional handover (CHO). In a CHO procedure, upon receiving CHO configuration in a radio resource control (RRC) reconfiguration message which contains configuration for multiple candidate cells, a UE starts evaluating the CHO execution conditions for the candidate cell(s). If at least one CHO candidate cell satisfies the corresponding CHO execution condition, the UE detaches from the source cell, applies configuration and synchronizes to the target cell and completes the CHO procedure by sending RRC reconfiguration complete message to the target gNB. The UE releases stored CHO configurations after successful completion of handover procedure.

To improve system performance and tightly link to LTE networks, another useful feature supported in 5G networks is dual connectivity (DC). In a DC operation, a multiple Rx/Tx capable UE can be configured to communicate with two different nodes, known as a master node (MN) serving a master cell group (MCG) and a secondary node (SN) serving a secondary cell group (SCG). The MN and the SN are connected via non-ideal backhaul, where one node provides NR access and the other one provides either E-UTRA or NR access. The UE connects to a primary cell (PCell) from the MCG and connects to a primary SCG cell (PSCell) from the SCG.

The UE establishes connection to a SN by SN addition/change procedure or conditional PSCell addition/change (CPAC) procedure where the CHO principle is applied to hand over the UE from the serving PSCell to a target PSCell intra-SN or inter-SN. Similarly, the UE may release CPAC configuration upon successful CPAC execution, i.e., after UE completes the random access procedure to the target PSCell and has sent RRC reconfiguration complete message to the MN. However, when successive CPC is needed for a UE moving fast, MN/SN may reinitiate the procedure via inter-node message exchange and reconfigure CPC by sending RRC reconfiguration message to the UE. This slows down successive PSCell change and causes connection interruption to the SN(s).

To reduce interruption in a handover and enable fast SN change at the same time, a joint operation of CHO and CPAC is desired. However, failure events can happen during the joint operation procedure of CHO and CPAC. The failure events need to be identified and the related failure recovery procedure may be specified.

In the present disclosure, the joint operation of CHO and CPA/CPC refers to CHO including target MCG and candidate SCGs for CPC/CPA. For the joint operation of CHO and CPA/CPC, failure events during the procedure are identified, including the radio link failure of MCG/SCG, CHO failure, and CPA/CPC failure. Failure recovery procedures are specified for the joint operation of CHO and CPAC, including RRC re-establishment procedure, conditional recovery procedure, and fast MCG/SCG recovery procedure.

A source MN sends an RRC reconfiguration message to trigger the joint operation of CHO and CPA. For one embodiment, the failure recovery procedure for the joint operation of CHO and CPA is shown in FIG. 6.

Figure 6:
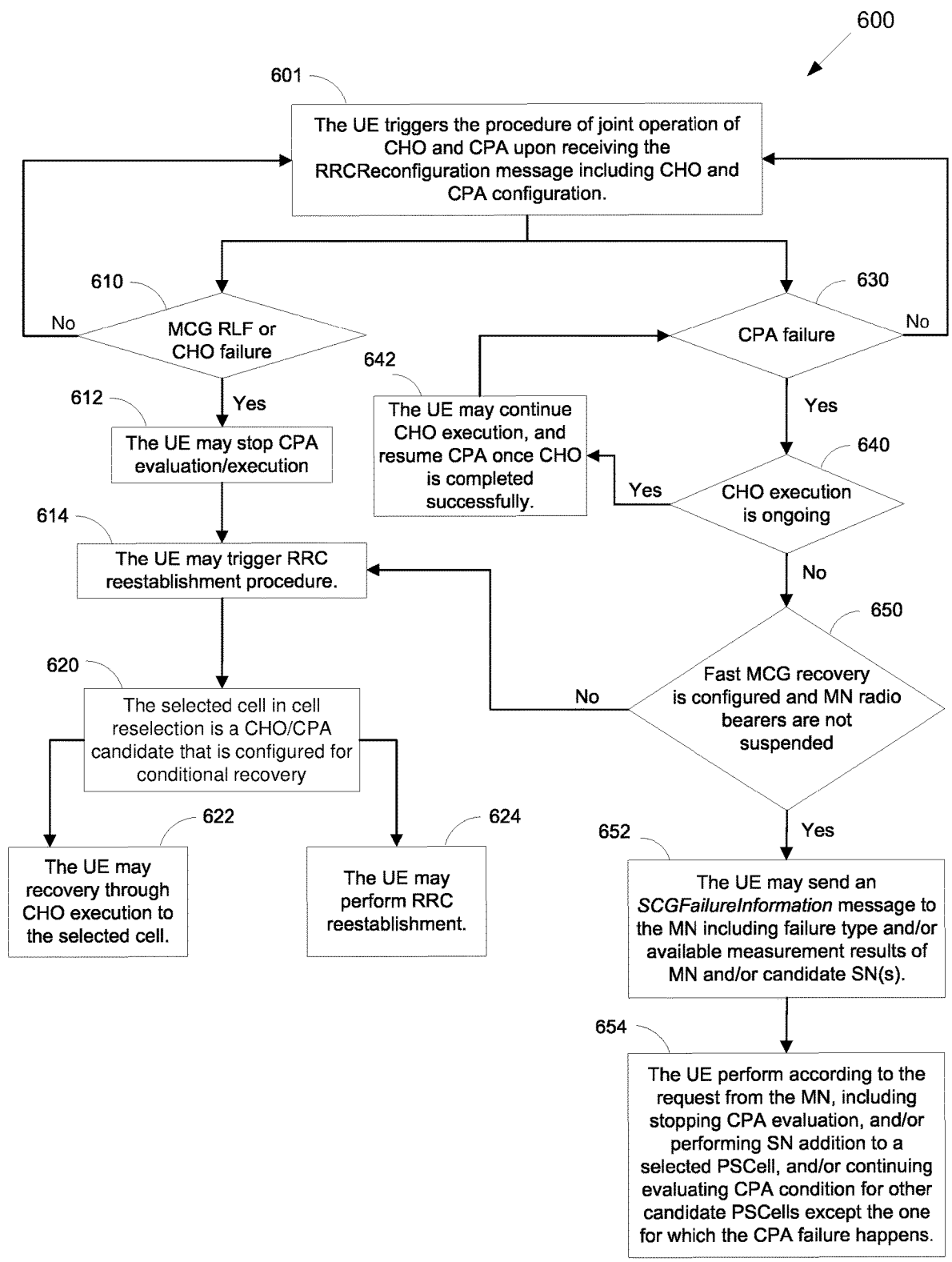
FIG. 6 illustrates a flowchart of a method for a failure recovery for a joint operation of CHO and CPA according to embodiments of the present disclosure.

FIG. 6 illustrates a flowchart of a method 600 for a failure recovery for a joint operation of CHO and CPA according to embodiments of the present disclosure. The method 600 as may be performed by a UE (e.g., 111-116 as illustrated in FIG. 1). An embodiment of the method 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

As illustrated in FIG. 6, a UE starts a procedure of joint operation of CHO and CPA upon receiving the RRCReconfiguration message including CHO and CPA configuration (601). After the reception of the RRC reconfiguration message, the MCG radio link failure (RLF) can happen before the CHO execution or after CHO completion (610). The initial CHO failure can happen before successful CHO completion due to configuration failure, e.g., the UE cannot comply the CHO configuration, and/or execution failure, e.g., reconfiguration with sync failure.

For these failure events, the UE may stop any ongoing CPA execution condition evaluation (612), and/or trigger the RRC reestablishment procedure (614). If the RRC reestablishment procedure is triggered, the UE may perform cell selection in accordance with the cell selection process (620). If the selected cell is a CHO candidate cell and attemptCondReconfig is enabled, i.e., conditional reconfiguration recovery is enabled, the UE may attempt CHO execution to the selected cell once. Otherwise, RRC reestablishment is performed (622).

In another embodiment, if the selected cell is a CPA candidate cell which is configured to be used for conditional reconfiguration recovery, the UE may attempt to perform a handover to the selected cell once according to the configuration of the candidate cell (622). Otherwise, RRC reestablishment is performed (624). The configuration for the joint CHO with CPA can be released or stored according to the indication in the RRC reconfiguration message. The UE may resume the joint operation or independent CPA operation and apply the stored configuration after the failure recovery.

On the other hand, after the UE receives RRC reconfiguration message, a CPA failure can happen due to configuration, e.g., if the UE cannot comply the CPA configuration, and/or execution failure, reconfiguration with sync failure during the CPA execution (630). For such failure events, if the UE is not performing CHO execution, e.g., not performing random access to the target (or candidate) PCell (no at 640), and if the fast MCG recovery is configured and/or the MN transmissions of radio bearers are not suspended (650), the UE may report the SCGFailureInformation to the MN, containing the failureType, e.g., synchReconfigFailureSCG for CPA execution failure or scg-reconfigFailure for CPA configuration failure (652).

If the SCGFailureInformation message is transmitted, the UE may include in the SCGFailureInformation message the measurement results available according to current measurement configuration for the candidate SNs (652). The UE can also include in the SCGFailureInformation message the cell ID (e.g., PCI) or configuration ID of the failed candidate PSCell.

Upon receiving the SCGFailureInformation message, the MN can send an RRC reconfiguration message or a MAC CE to request for the UE to stop evaluating the CPA execution condition, and/or to execute SN addition to a selected PSCell which can be a CPA candidate, and/or to request for the UE to continue evaluating CPA execution condition for other candidate PSCells except the candidate PSCell for which the CPA failure happens (654). Upon receiving the command from a MN, the UE can perform CPA or SN addition according to the command (654).

Alternatively, upon the CPA failure happens in the joint operation of CHO and CPA, the UE autonomously continues evaluating CPA execution conditions for other candidate PSCells except the candidate PSCell for which the CPA failure happens.

For the CPA failure event, if the fast MCG recovery is not configured or the MN transmissions for all radio bearers are suspended, the UE can autonomously continue to evaluate CPA execution conditions for other candidate PSCells except the candidate PSCell for which the CPA failure happens; alternatively, the UE can trigger the RRC reestablishment procedure, and may perform cell selection in accordance with the cell selection process (620). If the selected cell is a CHO candidate cell and attemptCondReconfig is enabled, i.e., conditional reconfiguration recovery is enabled, the UE can attempt CHO execution to the selected cell once. Otherwise, RRC reestablishment is performed (620, 622).

In another embodiment, if the selected cell is a CPA candidate cell which is configured to be used for conditional reconfiguration recovery, the UE can attempt to perform handover to the selected cell once according to the configuration of the candidate cell (620, 622). Otherwise, RRC reestablishment is performed (624). The configuration for the joint CHO with CPA can be released or stored according to the indication in RRC reconfiguration message. The UE can resume the joint operation or independent CPA operation and apply the stored configuration after the failure recovery.

For the CPA failure event, if the UE is performing CHO execution (640), e.g., performing random access procedure to the target PCell, the UE may continue the CHO execution (642). The UE can continue to CPA evaluation excluding the candidate PSCell for which CPA has failed. Alternatively, the UE can maintain the CPA configuration for the candidate PSCells associated with the target PCell and may resume CPA operation once CHO is completed successfully (642). Otherwise, if the CHO execution is failed, the UE can trigger the RRC re-establishment procedure (624).

The source MN sends a RRC reconfiguration message for the joint operation of CHO and CPC. For one embodiment, the failure recovery procedure for the joint operation of CHO and CPC is shown in FIG. 7 and FIG. 8.

Figure 7:
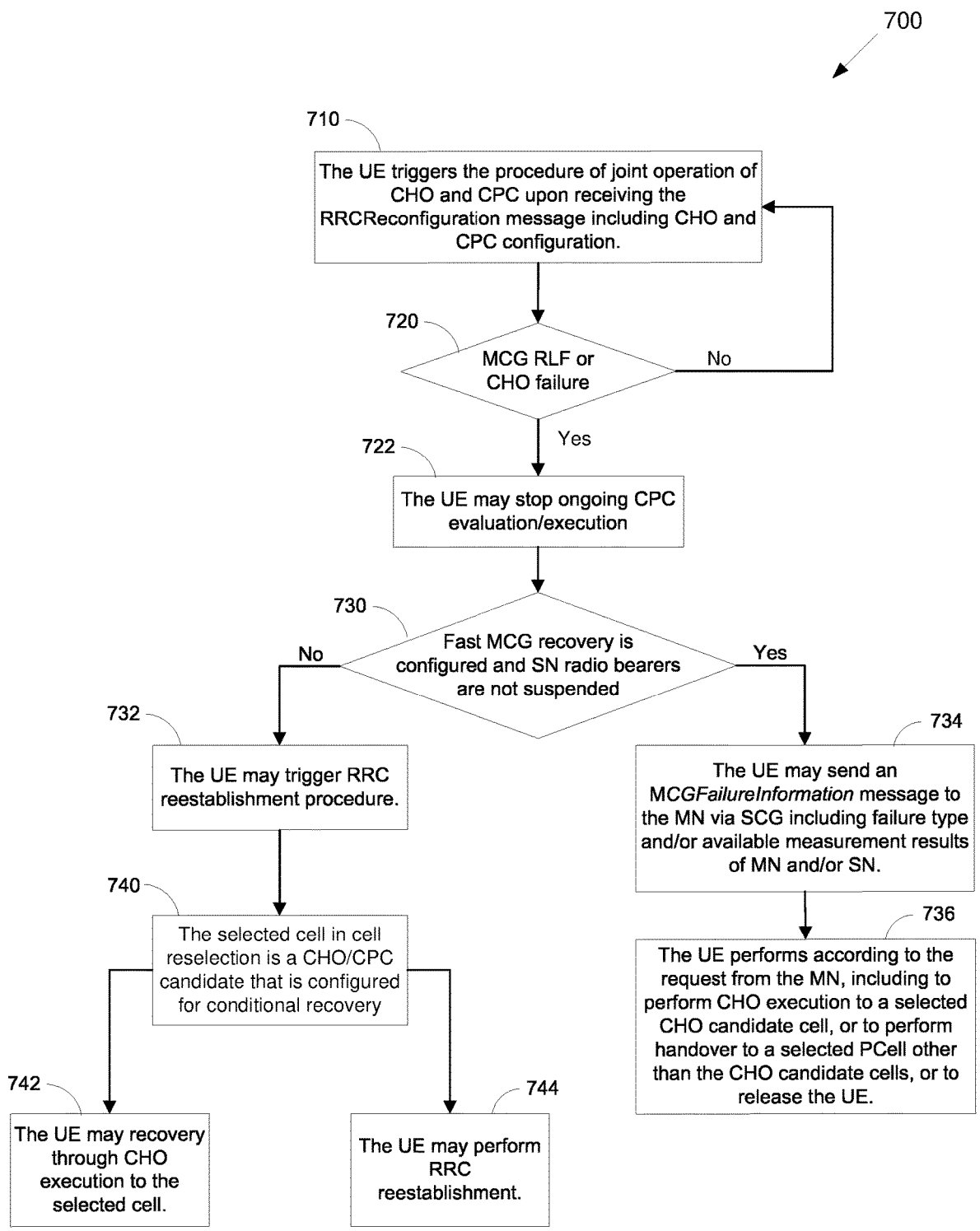
FIG. 7 illustrates a flowchart of a method for a failure recovery for MCG RLF or CHO failure in joint operation of CHO and CPC according to embodiments of the present disclosure.

FIG. 7 illustrates a flowchart of a method 700 for a failure recovery for MCG RLF or CHO failure in joint operation of CHO and CPC according to embodiments of the present disclosure. The method 700 as may be performed by a UE (e.g., 111-116 as illustrated in FIG. 1). An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

Figure 8:
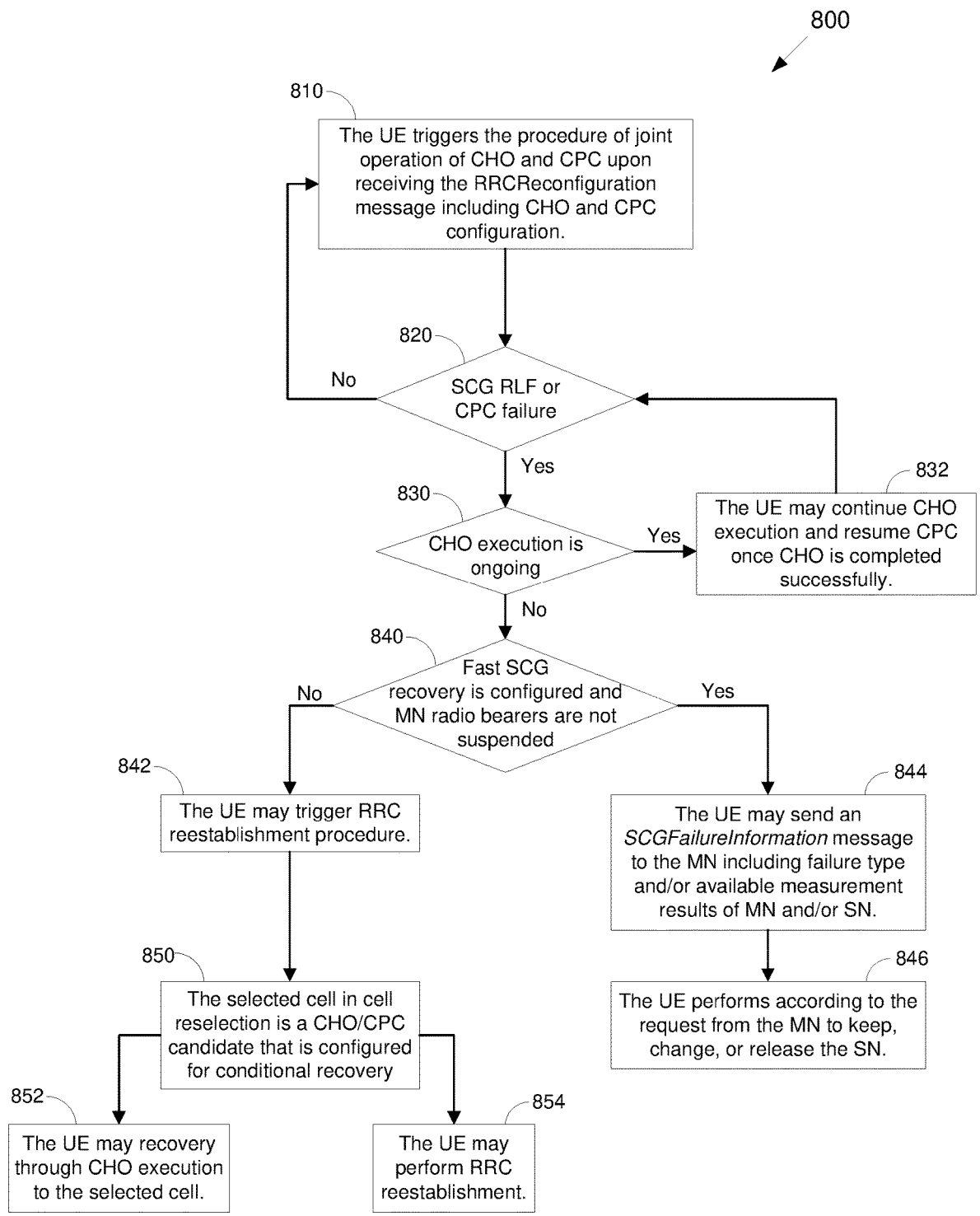
FIG. 8 illustrates a flowchart of a method for a failure recovery for SCG RLF or CPC failure in joint operation of CHO and CPC according to embodiments of the present disclosure.

FIG. 8 illustrates a flowchart of a method 800 for a failure recovery for SCG RLF or CPC failure in joint operation of CHO and CPC according to embodiments of the present disclosure. The method 800 as may be performed by a UE (e.g., 111-116 as illustrated in FIG. 1). An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

The UE starts the procedure of joint operation of CHO and CPC upon receiving the RRCReconfiguration message including CHO and CPC configuration (710, 810). After the UE receives the RRC reconfiguration message, the MCG RLF can happen before the CHO execution or after CHO completion. The initial CHO failure can happen before successful CHO completion due to configuration failure and/or execution failure (720).

For such failure events, the UE may stop ongoing CPC evaluation or execution (722). If fast MCG link recovery is configured and SCG transmissions of radio bearers are not suspended and not during CPC execution (730), the UE can trigger fast MCG link recovery procedure, that is the UE suspends MCG transmissions for all radio bearers and/or reports the MCG failure by sending the MCGFailureInformation message to the source MN via the SCG link, containing the failureType, e.g., synchReconfigFailureMCG for CHO execution failure or mcg-reconfigFailure for CHO configuration failure. The UE can include in the MCGFailureInformation message the measurement results available according to current measurement configuration of both the MN and the SN (734).

The UE can also include in the MCGFailureInformation message the cell ID (e.g., PCI) or configuration ID of the failed candidate PCell. Once the fast MCG link recovery is triggered, the UE can maintain the current measurement configurations from both the MN and the SN, and continue measurements based on configuration from the MN and the SN, if possible.

Once receiving the MCGFailureInformation message, the source MN can request the UE to perform CHO execution to a selected CHO candidate cell by sending an RRC message or MAC CE via the SCG, or the source MN can request the UE to perform handover to a selected PCell other than the CHO candidate cells by sending an RRC reconfiguration message with reconfigurationwithSync to the UE via the SCG, or the source MN can send an RRC release message to the UE via the SCG, or the source MN can request for the UE to continue the joint operation of CHO and CPC excluding the candidate PCell for which CHO fails (736). If the UE receives a PCell change command in an RRC message (e.g., RRCReconfiguration) or in a MAC CE where the target cell is a candidate cell of CHO, the UE applies the target cell configuration in the CHO configuration and performs random access to the target cell.

Alternatively, the UE can autonomously fall back to continue connection to the source PCell and continues the joint operation of CHO and CPC (e.g., evaluating execution conditions for candidate PCells and/or candidate PSCells) excluding the candidate PCell for which CHO has failed.

The configuration for the joint CHO with CPA can be released or stored according to the indication in the RRC message. The UE can resume the joint operation and apply the stored configuration after the failure recovery.

For the MCG RLF or the initial CHO failure, if fast MCG link recovery is not configured or if SN radio bearers are suspended or if during CPC execution (730), the UE can stop CPC execution and may trigger RRC connection re-establishment procedure (732). If the RRC connection re-establishment procedure is triggered, the UE can perform cell selection in accordance with the cell selection process (740). If the selected cell is a CHO candidate cell and attemptCondReconfig is enabled, i.e., conditional reconfiguration recovery is enabled, the UE can attempt CHO execution to the selected cell once. Otherwise, RRC reestablishment is performed (740, 742).

In another embodiment, if the selected cell is a CPC candidate cell which is configured to be used for conditional reconfiguration recovery, the UE can attempt to perform random access procedure to the selected cell once (740, 742). Otherwise, RRC reestablishment is performed (744). The configuration for the joint CHO with CPC for candidate cells can be released or stored according to the indication in the RRC message. The UE can resume the joint operation or independent CPC operation according and apply the stored configuration after the failure recovery.

On the other hand, after the UE receives the RRC reconfiguration message, the SCG RLF can happen before the CPC execution or after CPC completion. The initial CPC failure can happen before successful CPC completion due to configuration failure and/or execution failure (820). For such failure events, if the UE is not performing CHO execution (830), and if fast SCG recovery is configured and MCG transmissions of radio bearers are not suspended (840), the UE can trigger fast SCG link recovery procedure, that is the UE suspends SCG transmissions for all radio bearers and/or reports the failure with SCGFailureInformation message to the MN, containing the failureType, e.g., synchReconfigFailureSCG for CPC execution failure or scg-reconfigFailure for CPC configuration failure.

The UE can include in the SCGFailureInformation message the measurement results available according to current measurement configuration of both the MN and the SN (844). The UE can also include in the SCGFailureInformation message the cell ID (e.g., PCI) or configuration ID of the failed candidate PSCell.

The MN handles the SCGFailureInformation message and may decide to keep, change, or release the SN (846). For example, the MN can send an RRC reconfiguration message to release current SCG configuration, and/or to request the UE to continue CPC operation for other candidate PSCells except for the one where the CPC failure happens, and/or to request the UE to perform SCG change to a selected PSCell which may or may not be a CPC candidate PSCell.

Alternatively, the UE can autonomously continue evaluating CPC execution conditions for the configured candidate PSCells excluding the candidate cell for which CPC has failed.

The configuration for the joint CHO with CPC for candidate cells can be released or stored according to the indication in the RRC message (846). The UE can resume the joint operation or independent CHO and/or CPC operation accordingly and apply the stored configuration after the failure recovery.

For the SCG RLF or initial CPC failure, if the UE is not performing CHO execution (830) and if fast SCG recovery is not configured or MCG transmissions of radio bearers are suspended (840), the UE can continue CHO evaluation and/or CPC evaluation excluding the candidate PSCell for which CPC has failed; alternatively, the UE can stop CHO evaluation if ongoing and/or trigger RRC connection re-establishment procedure (842). If the RRC connection re-establishment procedure is triggered, the UE can perform cell selection in accordance with the cell selection process. If the selected PCell is a CHO candidate cell and attemptCondReconfig is enabled, i.e., conditional reconfiguration recovery is enabled, the UE can attempt CHO execution to the selected cell once (850, 852). Otherwise, RRC reestablishment is performed (854).

In another embodiment, if the selected PCell is a CPC candidate cell which is configured to be used for conditional reconfiguration recovery, the UE can attempt to perform random access procedure to the selected cell once (850, 852). Otherwise, RRC reestablishment is performed (854). The configuration for the joint CHO with CPC for candidate cells can be released or stored according to the indication in the RRC message. The UE can resume the joint operation or independent CHO and/or CPC operation and apply the stored configuration after the failure recovery.

If the SCG RLF or initial CPC failure happens during CHO execution, the UE may continue CHO execution (830, 832). The UE can at the same time continue CPC evaluation for other candidate PSCells excluding the candidate PSCell for which CPC has failed. Alternatively, the UE can maintain the CPC configuration for the candidate PSCells associated with the target PCell and resume CPC operation once CHO is completed successfully (832). Otherwise, if the CHO execution is failed, the UE can trigger the RRC re-establishment procedure.

Figure 9:
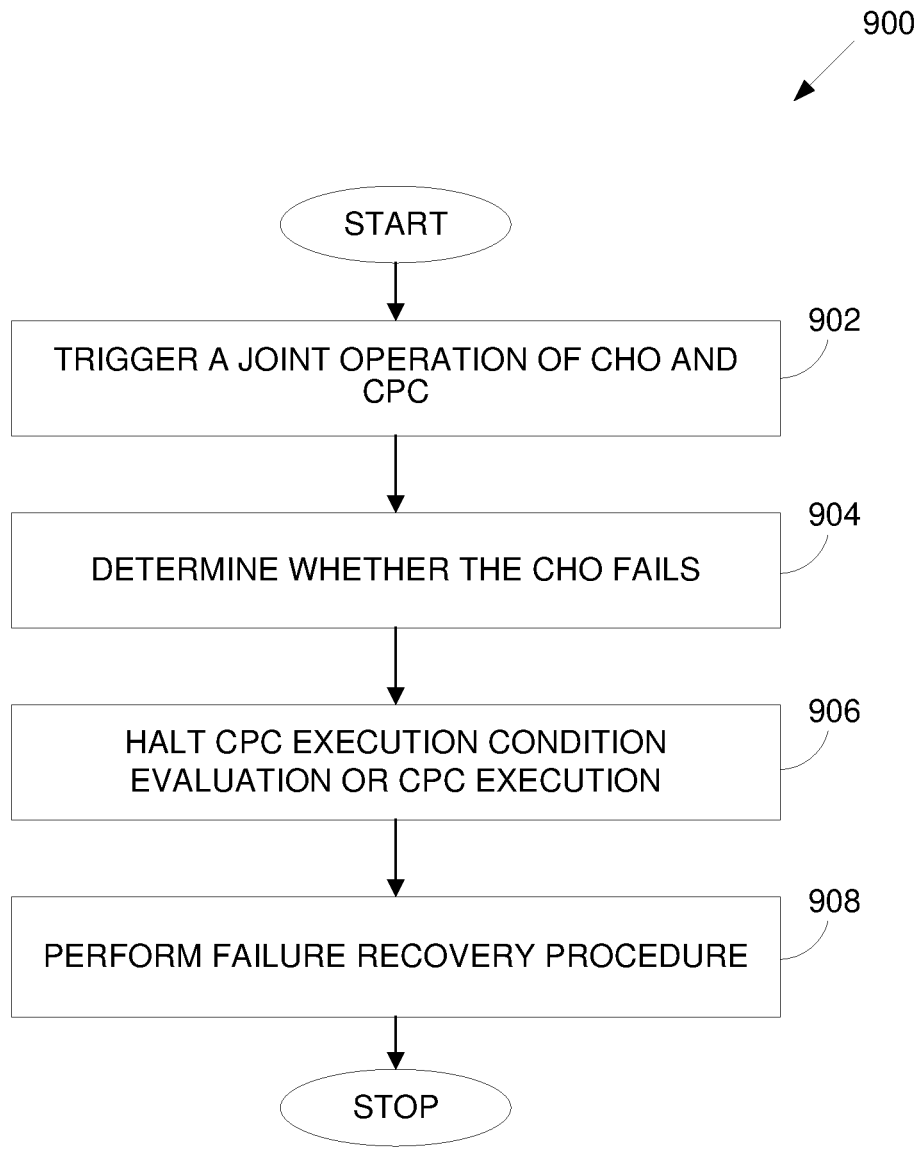
FIG. 9 illustrates a flowchart of method for a failure recovery for a joint operation of conditional handover and conditional PSCell addition or change according to embodiments of the present disclosure.

FIG. 9 illustrates a flowchart of method 900 for a failure recovery for a joint operation of conditional handover and conditional PSCell addition or change according to embodiments of the present disclosure. The method 1000 as may be performed by a UE (e.g., 111-116 as illustrated in FIG. 1). An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, the method 900 begins at step 902. In step 902, the UE triggers a joint operation of a CHO and a CPC.

In step 904, the UE determines whether the CHO fails while performing the joint operation of the CHO and the CPC.

In step 906, the UE halts a CPC execution condition evaluation, or a CPC execution based on a determination that the CHO fails.

In step 908, the UE performs a failure recovery procedure for the joint operation of the CHO and the CPC.

In one embodiment, upon CHO fails while performing the joint operation of the CHO and the CPC, the UE determines that (i) a fast MCG link recovery is configured, (ii) SCG transmissions for radio bearers are not suspended, and (iii) the CPC execution is not being performed; and for the failure recovery procedure, transmitting a message to the SCG indicating a failure of the CHO in the joint operation of the CHO and the CPC and receiving a command to perform a handover to a candidate PCell.

In one embodiment, upon CHO fails while performing the joint operation of the CHO and the CPC, the UE performs the failure recovery procedure based on initiating an RRC connection re-establishment procedure based on a determination that (i) a fast MCG link recovery is not configured, (ii) secondary node (SN) bearers are suspended, or (iii) the CPC execution is being performed.

In one embodiment, the UE determines whether a SCG RLF occurs, or a CPA/CPC fails while performing the CHO to a target PCell, maintains a CPA/CPC configuration for candidate PSCells associated with the target PCell based on a determination that the SCG RLF occurs or the CPA/CPC fails, and resumes the CPC execution condition evaluation when the CHO is completed.

In one embodiment, when a CHO execution is not being performed, the UE determines whether a SCG RLF occurs or the CPC fails; determines, based on a determination that the SCG RLF occurs or the CPC fails, whether (i) a fast SCG link recovery is configured, and (ii) MCG transmissions for radio bearers are available; transmits, to a MCG, a message indicating a failure of the CPC in the joint operation of the CHO and the CPC; receives a command to continue the CPC execution condition evaluation for candidate PSCells, excluding the candidate PSCell for which the CPC fails; and initiates an RRC connection re-establishment procedure when the MCG transmissions of the radio bearers are not available.

In one embodiment, the UE, when the CHO fails while performing a joint operation of a CHO and a CPA, halts a CPA execution condition evaluation or a CPA execution; and performs a radio resource control (RRC) connection re-establishment procedure.

In one embodiment, the UE determines that a CPA fails when performing a joint operation of the CHO and a CPA; based on a determination that the CPA fails, transmits, to a serving cell, a report indicating a failure of CPA; receives a command of SN addition for a target candidate PSCell included in candidate PSCells; and applies a configuration of the candidate target PSCell and perform a random access procedure to the target candidate PSCell.

In one embodiment, the UE determines that a CPA fails when performing a joint operation of the CHO and a CPA; receives a command to continue a CPA execution condition evaluation; and performs the CPA execution condition evaluation for candidate PSCells, excluding the candidate PSCell for which the CPA fails.

In one embodiment, the UE performs a handover to a selected cell based on a stored configuration in an RRC re-establishment procedure to recover failures in a joint operation of the CHO and a CPA/CPC, the selected cell being a CHO/CPA/CPC candidate cell that is configured for a conditional reconfiguration recovery.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
   a transceiver; and
   a processor operably coupled to the transceiver; the processor configured to:
   trigger a joint operation of a conditional handover (CHO) and a conditional primary secondary cell group (SCG) cell (PSCell) change (CPC),
   determine whether the CHO fails while performing the joint operation of the CHO and the CPC,
   halt a CPC execution condition evaluation or a CPC execution based on a determination that the CHO fails, and
   perform a failure recovery procedure for the joint operation of the CHO and the CPC, wherein the failure recovery procedure is initiated by a radio resource control (RRC) procedure based on the CPC execution.

2. The UE of claim 1, wherein:
   the processor is further configured to determine based on a determination that (i) a fast master cell group (MCG) link recovery is configured, (ii) SCG transmissions for radio bearers are not suspended, and (iii) the CPC execution is not being performed, to perform the failure recovery procedure by instructing the transceiver to:

transmit a message to a SCG indicating a failure of the CHO in the joint operation of the CHO and the CPC; and receive a command to perform a handover to a candidate primary cell (PCell).

3. The UE of claim 1, wherein the processor is further configured to perform the failure recovery procedure by initiating RRC connection re-establishment procedure based on a determination that (i) a fast master cell group (MCG) link recovery is not configured, (ii) secondary node (SN) bearers are suspended, or (iii) the CPC execution is being performed.

4. The UE of claim 1, wherein the processor is further configured to:
determine whether a SCG radio link failure (RLF) occurs or a conditional PSCell addition (CPA)/CPC fails while performing the CHO to a target PCell;
maintain a CPA/CPC configuration for candidate PSCells associated with the target PCell based on a determination that the SCG RLF occurs or the CPA/CPC fails; and
resume the CPC execution condition evaluation when the CHO is completed.

5. The UE of claim 1, wherein:
the processor is further configured to:
determine whether a SCG radio link failure (RLF) occurs or the CPC fails, and
determine, based on a determination that the SCG RLF occurs or the CPC fails, whether (i) a fast SCG link recovery is configured, (ii) master cell group (MCG) transmissions for radio bearers are available, and (iii) a CHO execution is not being performed;
the transceiver is further configured to:
transmit, to a MCG, a message indicating a failure of the CPC in the joint operation of the CHO and the CPC, and
receive a command to continue the CPC execution condition evaluation for candidate PSCells, excluding the candidate PSCell for which the CPC fails; and
the processor is further configured to initiate a RRC connection re-establishment procedure when the MCG transmissions of the radio bearers are not available.

6. The UE of claim 1, wherein, when the CHO fails while performing a joint operation of a CHO and a conditional PSCell addition (CPA), the processor is further configured to:
halt a CPA execution condition evaluation or a CPA execution; and
perform a RRC connection re-establishment procedure.

7. The UE of claim 1, wherein:
the processor is further configured to determine that a conditional PSCell addition (CPA) fails when performing a joint operation of the CHO and a CPA;
the transceiver is further configured to:
based on a determination that the CPA fails, transmit, to a serving cell, a report indicating a failure of CPA, and
receive a command of secondary node (SN) addition for a target candidate PSCell included in candidate PSCells; and
the processor is further configured to apply a configuration of the candidate target PSCell and perform a random access procedure to the target candidate PSCell.

8. The UE of claim 1, wherein:
the processor is further configured to determine that a conditional PSCell addition (CPA) fails when performing a joint operation of the CHO and a CPA;

the transceiver is further configured to receive a command to continue a CPA execution condition evaluation; and
the processor is further configured to perform the CPA execution condition evaluation for candidate PSCells, excluding the candidate PSCell for which the CPA fails.

9. The UE of claim 1, wherein the processor is further configured to perform a handover to a selected cell based on a stored configuration in a RRC re-establishment procedure to recover failures in a joint operation of the CHO and a conditional PSCell addition (CPA)/CPC, the selected cell being a CHO/CPA/CPC candidate cell that is configured for a conditional reconfiguration recovery.

10. The UE of claim 1, wherein the processor is further configured to:
release or store a configuration of a joint operation of the CHO and a conditional PSCell addition (CPA)/CPC based on an indication included in a RRC message; and
resume the joint operation of the CHO and the CPA/CPC when the configuration of the joint operation of the CHO and the CPA/CPC is stored.

11. A method of a user equipment (UE) in a wireless communication system, the method comprising:
triggering a joint operation of a conditional handover (CHO) and a conditional primary secondary cell group (SCG) cell (PSCell) change (CPC);
determining whether the CHO fails while performing the joint operation of the CHO and the CPC;
halting a CPC execution condition evaluation or a CPC execution based on a determination that the CHO fails; and
performing a failure recovery procedure for the joint operation of the CHO and the CPC, wherein the failure recovery procedure is initiated by a RRC connection procedure based on the CPC execution.

12. The method of claim 11, further comprising:
determining that (i) a fast master cell group (MCG) link recovery is configured, (ii) SCG transmissions for radio bearers are not suspended, and (iii) the CPC execution is not being performed; and
wherein performing the failure recovery procedure further comprises transmitting a message to a SCG indicating a failure of the CHO in the joint operation of the CHO and the CPC and receiving a command to perform a handover to a candidate primary cell (PCell).

13. The method of claim 11, wherein performing the failure recovery procedure further comprises performing the failure recovery procedure based on initiating a RRC connection re-establishment procedure based on a determination that (i) a fast master cell group (MCG) link recovery is not configured, (ii) secondary node (SN) bearers are suspended, or (iii) the CPC execution is being performed.

14. The method of claim 11, further comprising:
determining whether a SCG radio link failure (RLF) occurs or a conditional PSCell addition (CPA)/CPC fails while performing the CHO to a target PCell;
maintaining a CPA/CPC configuration for candidate PSCells associated with the target PCell based on a determination that the SCG RLF occurs or the CPA/CPC fails; and
resuming the CPC execution condition evaluation when the CHO is completed.

15. The method of claim 11, further comprising:
determining whether a SCG radio link failure (RLF) occurs or the CPC fails;
determining, based on a determination that the SCG RLF occurs or the CPC fails, whether (i) a fast SCG link recovery is configured, (ii) master cell group (MCG)

transmissions for radio bearers are available, and (iii) a CHO execution is not being performed;

transmitting, to a MCG, a message indicating a failure of the CPC in the joint operation of the CHO and the CPC;

receiving a command to continue the CPC execution condition evaluation for candidate PSCells, excluding the candidate PSCell for which the CPC fails; and initiating a RRC connection re-establishment procedure when the MCG transmissions of the radio bearers are not available.

16. The method of claim 11, further comprising, when the CHO fails while performing a joint operation of a CHO and a conditional PSCell addition (CPA):

halting a CPA execution condition evaluation or a CPA execution; and performing a RRC connection re-establishment procedure.

17. The method of claim 11, further comprising:

determining that a conditional PSCell addition (CPA) fails when performing a joint operation of the CHO and a CPA;

based on a determination that the CPA fails, transmitting, to a serving cell, a report indicating a failure of CPA;

receiving a command of secondary node (SN) addition for a target candidate PSCell included in candidate PSCells; and applying a configuration of the candidate target PSCell and perform a random access procedure to the target candidate PSCell.

18. The method of claim 11, further comprising:

determining that a conditional PSCell addition (CPA) fails when performing a joint operation of the CHO and a CPA;

receiving a command to continue a CPA execution condition evaluation; and performing the CPA execution condition evaluation for candidate PSCells, excluding the candidate PSCell for which the CPA fails.

19. The method of claim 11, further comprising performing a handover to a selected cell based on a stored configuration in a RRC re-establishment procedure to recover failures in a joint operation of the CHO and a conditional PSCell addition (CPA)/CPC, the selected cell being a CHO/CPA/CPC candidate cell that is configured for a conditional reconfiguration recovery.

20. A base station (BS) in a wireless communication system, the BS comprising:

a processor; and a transceiver operably coupled to the processor, the transceiver configured to, for a joint operation of a conditional handover (CHO) and a conditional primary secondary cell group (SCG) cell (PSCell) change (CPC):

when (i) a fast master cell group (MCG) link recovery is configured, (ii) SCG transmissions for radio bearers are not suspended, and (iii) execution of the CPC execution is halted:

receive, from a user equipment (UE), a message indicating a failure of the CHO in the joint operation of the CHO and the CPC; and transmit a command to perform a handover to a candidate primary cell (PCell); and when (i) the MCG link recovery is not configured, (ii) secondary node (SN) bearers are suspended, or (iii) the CPC execution is not halted: perform a radio resource control (RRC) connection re-establishment procedure with the UE, wherein a failure recovery procedure for the joint operation of the CHO and the CPC is initiated by an RRC procedure based on the CPC execution.

* * * * *